US012264534B2

(12) United States Patent
Welage

(10) Patent No.: US 12,264,534 B2
(45) Date of Patent: Apr. 1, 2025

(54) DOOR GUARD

(71) Applicant: DOOR & WINDOW GUARD SYSTEMS, INC., Chicago, IL (US)

(72) Inventor: Ryan Welage, Chicago, IL (US)

(73) Assignee: DOOR & WINDOW GUARD SYSTEMS, INC., Chicago, IL (US)

( * ) Notice: Subject to any disclaimer, the term of this patent is extended or adjusted under 35 U.S.C. 154(b) by 0 days.

(21) Appl. No.: 18/234,279

(22) Filed: Aug. 15, 2023

(65) Prior Publication Data

US 2025/0059822 A1 Feb. 20, 2025

(51) Int. Cl.
*E05D 7/00* (2006.01)
*E06B 5/11* (2006.01)

(52) U.S. Cl.
CPC .................................... *E06B 5/113* (2013.01)

(58) Field of Classification Search
CPC ....................................................... E06B 5/113
USPC ........................................ 49/395, 402, 383.1
See application file for complete search history.

(56) References Cited

U.S. PATENT DOCUMENTS 1,485,312 A * 2/1924 Sweeley ................ B61D 17/16 49/402
1,788,928 A 1/1931 Mills
1,973,461 A * 9/1934 Barringer ................ E06B 7/232 49/383
2,549,661 A 4/1951 Carney
2,611,933 A 9/1952 Comfort
2,622,285 A 12/1952 Roos
2,772,447 A 12/1956 Preston
3,120,032 A 2/1964 Burnette
3,634,962 A * 1/1972 Peterson ................... E06B 7/24 49/470
3,696,561 A * 10/1972 Harp ....................... E06B 7/231 220/378
3,978,614 A 9/1976 Goldhaber
4,098,025 A 7/1978 Stock et al.
4,175,357 A 11/1979 Goldhaber
4,288,944 A 9/1981 Donovan
4,447,985 A * 5/1984 Weber ..................... E06B 3/308 49/501
4,495,731 A * 1/1985 Sears ..................... B60J 7/1642 49/505
4,520,736 A 6/1985 Crosby et al.

(Continued)

FOREIGN PATENT DOCUMENTS

BG 2160248 12/1985
BG 2270336 3/1994

(Continued)

OTHER PUBLICATIONS

Brochure, "National Arson Prevention Initiative board up procedures," U.S. Fire Administration (2003).

*Primary Examiner* — Jerry E Redman
(74) *Attorney, Agent, or Firm* — Barnes & Thornburg LLP

(57) ABSTRACT

An assembly for securely enclosing a door opening or window opening defined by a structure of a building comprising. The assembly includes a panel that is sized to substantially cover the opening and is pivotally secured to a frame. In some cases, the panel includes a proximal side pivotally connected with the frame and a distal side that swings between an open and closed position. The panel includes a door guard configured to protect the distal side of the panel from being forcibly pried away from the frame.

11 Claims, 6 Drawing Sheets

(56) References Cited

U.S. PATENT DOCUMENTS

| | | | | | |
|---|---|---|---|---|---|
| 4,606,566 | A | | 8/1986 | Bott | |
| 4,608,780 | A | * | 9/1986 | Van Noy | A47L 15/4263 49/483.1 |
| 4,938,154 | A | | 7/1990 | Watt | |
| 5,097,629 | A | * | 3/1992 | Guhl | E05F 11/24 49/386 |
| 5,207,022 | A | | 5/1993 | Watt | |
| 5,289,655 | A | | 3/1994 | Marmora et al. | |
| 5,295,326 | A | * | 3/1994 | Dickey | E06B 7/18 49/482.1 |
| 5,335,452 | A | | 8/1994 | Taylor | |
| 5,355,644 | A | * | 10/1994 | Guhl | E04D 13/1415 52/200 |
| 5,365,706 | A | | 11/1994 | Elsenpeter et al. | |
| 5,472,247 | A | | 12/1995 | Monson | |
| 5,487,237 | A | | 1/1996 | Martin, Jr. | |
| 5,683,123 | A | | 11/1997 | Ruoss | |
| 5,722,206 | A | | 3/1998 | McDonald | |
| 5,737,874 | A | | 4/1998 | Sipos et al. | |
| 5,778,708 | A | | 7/1998 | Crosby | |
| 5,822,924 | A | * | 10/1998 | Wijninga | E06B 5/113 49/383 |
| 5,832,671 | A | | 11/1998 | White | |
| 5,832,758 | A | | 11/1998 | White | |
| 5,845,433 | A | * | 12/1998 | Walsh | E05D 11/0027 49/383 |
| 5,852,903 | A | | 12/1998 | Astrizky | |
| 5,937,593 | A | | 8/1999 | White | |
| 6,115,977 | A | | 9/2000 | Hornberger | |
| 6,185,871 | B1 | | 2/2001 | Wang | |
| 6,205,713 | B1 | | 3/2001 | Thompson | |
| 6,216,391 | B1 | | 4/2001 | Garrett, Jr. | |
| 6,345,476 | B1 | | 2/2002 | Hill | |
| 6,375,244 | B1 | | 4/2002 | Smeltzer | |
| 6,510,654 | B1 | | 1/2003 | McCracken | |
| 6,609,750 | B1 | * | 8/2003 | Cauduro | B60J 7/1642 296/216.02 |
| 6,914,184 | B1 | * | 7/2005 | Lahita | H05K 9/0015 174/374 |
| 7,650,723 | B1 | | 1/2010 | Kotlarich | |
| 7,775,002 | B2 | | 8/2010 | Puchniak | |
| 7,908,803 | B2 | | 3/2011 | Puchniak | |
| 8,046,967 | B2 | | 11/2011 | Suare | |
| 8,191,317 | B2 | * | 6/2012 | Lundsgaard | E05D 3/06 52/72 |
| 8,459,704 | B2 | | 6/2013 | Daniels | |
| 8,490,346 | B2 | | 7/2013 | Wedren | |
| 8,522,484 | B2 | * | 9/2013 | Gaviglia | E06B 1/52 174/374 |
| 8,656,642 | B2 | | 2/2014 | Boens | |
| 8,925,251 | B1 | * | 1/2015 | Rust | E06B 7/18 49/495.1 |
| 9,187,905 | B2 | * | 11/2015 | Smith | E04D 13/0305 |
| 9,562,379 | B2 | | 2/2017 | Olsen | |
| 10,947,773 | B2 | * | 3/2021 | Reese | E06B 7/22 |
| 2002/0095884 | A1 | * | 7/2002 | Lindgren | E06B 9/58 52/72 |
| 2003/0067176 | A1 | | 4/2003 | Stevens | |
| 2004/0055218 | A1 | | 3/2004 | Forsyth et al. | |
| 2008/0040976 | A1 | * | 2/2008 | Salzer | E05D 15/52 49/50 |
| 2008/0314236 | A1 | * | 12/2008 | Savage | F41H 7/044 89/36.02 |
| 2009/0090062 | A1 | | 4/2009 | Pandorf | |
| 2010/0181882 | A1 | * | 7/2010 | Lee | H05K 7/1488 49/402 |
| 2011/0107692 | A1 | | 5/2011 | Duncan | |
| 2012/0167476 | A1 | | 7/2012 | Weinerman | |
| 2013/0111833 | A1 | | 5/2013 | Glass | |
| 2015/0004076 | A1 | * | 1/2015 | Weisshaupt | A61L 2/26 422/292 |
| 2015/0075080 | A1 | * | 3/2015 | Ellingson | H02B 1/28 49/489.1 |

FOREIGN PATENT DOCUMENTS

| | | | | | |
|---|---|---|---|---|---|
| BG | 2277548 | | | 11/1994 | |
| CA | 2444030 | A1 | * | 4/2005 | E05B 17/2003 |
| CN | 104047636 | A | * | 9/2014 | |
| DE | 202010009205 | U1 | * | 10/2010 | E06B 5/113 |
| DE | 102010003970 | A1 | * | 3/2011 | E06B 5/113 |
| EP | 79194 | A | * | 5/1983 | B60J 7/1642 |
| FR | 2391342 | A | * | 1/1979 | E06B 5/113 |
| FR | 2604476 | A | * | 4/1988 | E06B 5/113 |
| FR | 2639672 | A | * | 6/1990 | E06B 5/113 |
| FR | 2669076 | A1 | * | 5/1992 | E06B 5/113 |
| FR | 2676498 | A1 | * | 11/1992 | E05D 11/04 |
| GB | 2123467 | A | * | 2/1984 | E06B 3/723 |
| KR | 100912192 | B1 | * | 8/2009 | |
| WO | WO-2023152392 | A1 | * | 8/2023 | A47B 88/50 |

* cited by examiner

DOOR GUARD

TECHNICAL FIELD

This disclosure relates generally to an assembly for securing a door opening or other opening of a building; in particular, this disclosure relates to such an assembly with a protection feature that protects against attempts to pry open the assembly's door panel by force.

BACKGROUND

Abandoned, vacant, fire damaged, or buildings undergoing rehab are often targets for trespassers and for criminal or dangerous activity because, among other reasons, such structures typically include doors and windows which allow ready entry and egress into the structures. It typically is difficult, if not impossible, to adequately secure the doors and windows or to otherwise keep trespassers from being readily able to break and enter into such structure through the doors or windows using wood, dogs or guards. Not only can criminal or other dangerous activity of trespassers detrimentally impact the value of the property, it also creates significant liability risks to the property owners and public safety personnel and causes a drain on public safety personnel through the need to patrol, nuisance calls, and fires.

One way to secure doors and windows of abandoned or vacant homes is described in U.S. Pat. No. 8,756,883, which is hereby incorporated by reference in its entirety. FIG. 1 shows an example assembly 10 in accordance with the '883 patent that is installed on a wall 12 to cover a door opening. As shown, there is a frame assembly 14 to which a door panel 16 is pivotally connected. There is a lock assembly 18 that is movable between a locked position that locks the door panel 16 with respect to the frame assembly 14 and an unlocked position that unlocks the door panel 16 with respect to the frame assembly 14. In the unlocked position, the door panel 16 can be pivoted with respect to the frame assembly 14 to provide access to the door opening.

As shown, the door panel 16 has a proximal side 20 about which the door panel 16 pivots, and a distal side 22 with a lip 24 that runs along the distal side 22. Although the assembly 10 generally works well for its intended purpose, the lip 24 is exposed and can be an attack point for forcibly trying to open the door panel 16. For example, an intruder may attempt to pry the door panel 16 open with a crowbar or piece of wood using the lip 24. Although it is unlikely the intruder will be successful in gaining access to the building through the door opening, the intruder will often damage the door panel 16 and/or frame assembly 14, and repairs will be needed. FIGS. 2 and 3 show damage to door panels after an intruder attempted to pry open the door panel using the lip 24. As can be seen, an intruder has attempted to pry the door panel 16 open with force using the lip 24, which has left the door panel 16 is warped with the lip 24 bent away from the frame assembly 14.

Therefore, there is a need for an assembly that secures a door opening or other opening while protecting against attempts to pry open the assembly's door panel.

SUMMARY

According to one aspect, this disclosure provides an assembly for securely enclosing a door opening or window opening defined by a structure of a building comprising. The assembly includes a frame sized to be disposed to substantially surround the opening and engage one side of the structure. There is a panel sized to substantially cover the opening, the panel having a front and a back, the panel being pivotally secured to the frame and pivotable between an open position and a closed position substantially covering the opening. In some cases, there is installation hardware to secure the frame to the structure such that the frame and the panel are disposed substantially on one side of the structure and the frame engages the one side of the structure, and the installation hardware is disposed substantially on an other side of the structure and engages the other side of the structure. There is locking means for selectively locking the panel to the frame in the closed position and unlocking the panel so that it can be pivoted to the open position when the installation hardware is secured to the frame. In some embodiments, the panel includes a proximal side pivotally connected with the frame and a distal side movable between a position adjacent the frame when the panel is in the closed position and a position extending away from the frame when the panel is in the open position. In some cases, the distal end of the panel includes a flange extending inwardly from the panel towards the frame.

According to another aspect, this disclosure provides an assembly for securely enclosing a door opening or window opening defined by a structure of a building comprising. The assembly includes a frame sized to be disposed to substantially surround the opening and engage one side of the structure. There is a panel sized to substantially cover the opening, the panel having a front and a back, the panel being pivotally secured to the frame and pivotable between an open position and a closed position substantially covering the opening. In some cases, there is installation hardware to secure the frame to the structure such that the frame and the panel are disposed substantially on one side of the structure and the frame engages the one side of the structure, and the installation hardware is disposed substantially on an other side of the structure and engages the other side of the structure. There is locking means for selectively locking the panel to the frame in the closed position and unlocking the panel so that it can be pivoted to the open position when the installation hardware is secured to the frame. In some embodiments, the panel includes a proximal side pivotally connected with the frame and a distal side movable between a position adjacent the frame when the panel is in the closed position and a position extending away from the frame when the panel is in the open position. In some cases, the panel includes a door guard configured to protect the distal side of the panel from being forcibly pried away from the frame.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
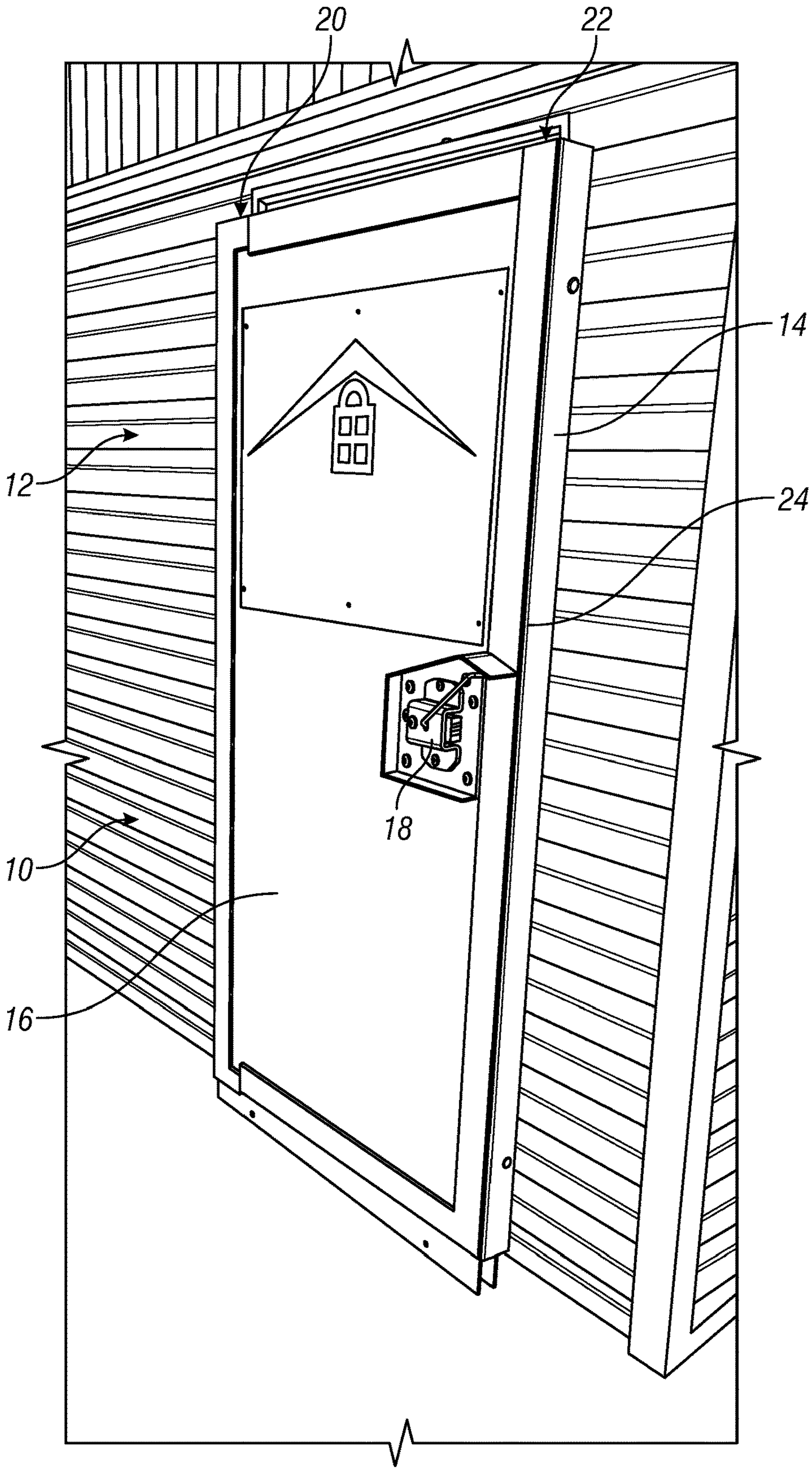
FIG. 1 (Prior Art)
FIG. 1 is a perspective view of an assembly for securing a building opening according to the prior art from outside the building.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural features may be shown in specific arrangements. However, it should be appreciated that such specific arrangements may not be required. Rather, in some embodiments, such features may be arranged in a different manner than shown in the illustrative figures. Additionally, the inclusion of a structural in a particular figure is not meant to imply that such feature is required in all embodiments and, in some embodiments, may not be included or may be combined with other features.

This disclosure relates to an improvement to the "Assembly and Method for Securing a Door Opening or Other Opening of a Building Structure" disclosed in U.S. Pat. No. 8,756,883, which is hereby incorporated by reference in its entirety. Although this patent describes an assembly that is generally satisfactory for its intended purposes, a common problem is an intruder prying the edge of the door in an attempt to force the door open (using a crowbar, piece of wood, etc.). It is unlikely, but possible, that the intruder is successful to the point where the intruder can get into the building but more often they damage the door and it needs to be fixed at least for cosmetic reasons for purposes of the existing property and/or for purposes of redeployment of the door to other properties.

Figure 2:
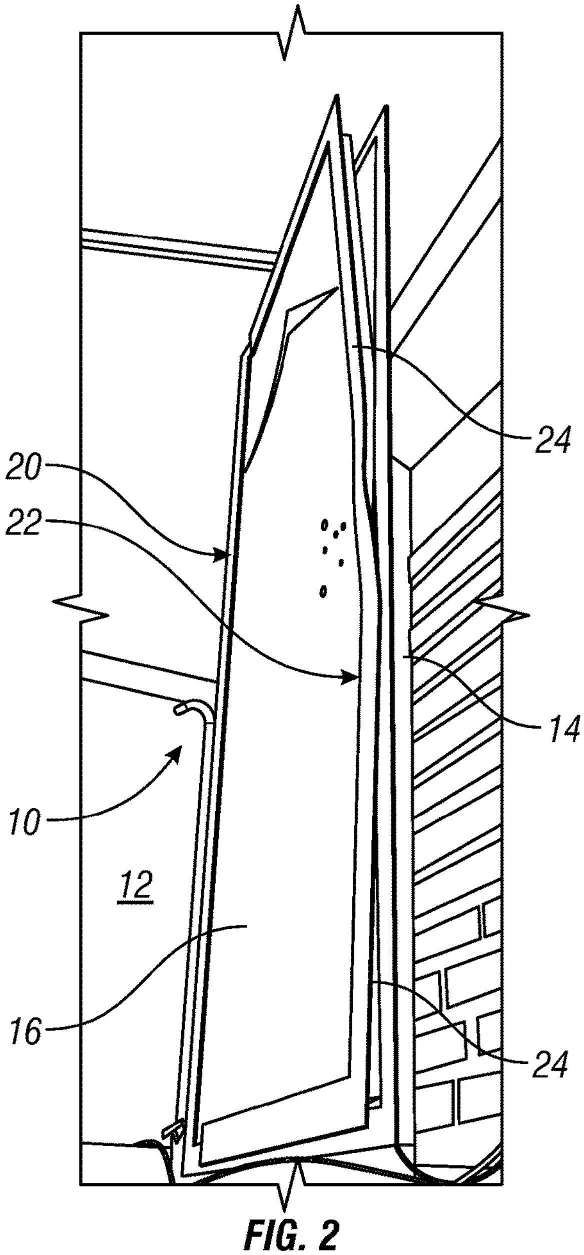
FIG. 2 (Prior Art)
FIG. 2 is a perspective view of an assembly for securing a building opening according to the prior art from outside the building after an intruder has attempted to pry open the door panel.
Figure 3:
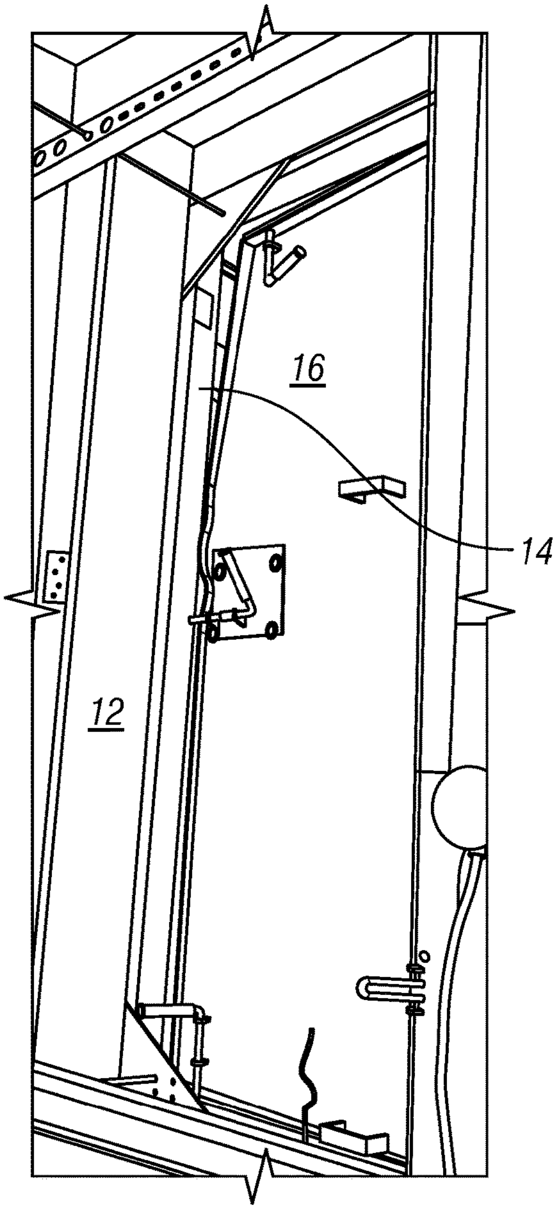
FIG. 3 (Prior Art)
FIG. 3 is a perspective view of an assembly for securing a building opening according to the prior art from inside the building after an intruder has attempted to pry open the door panel.
Figure 4:
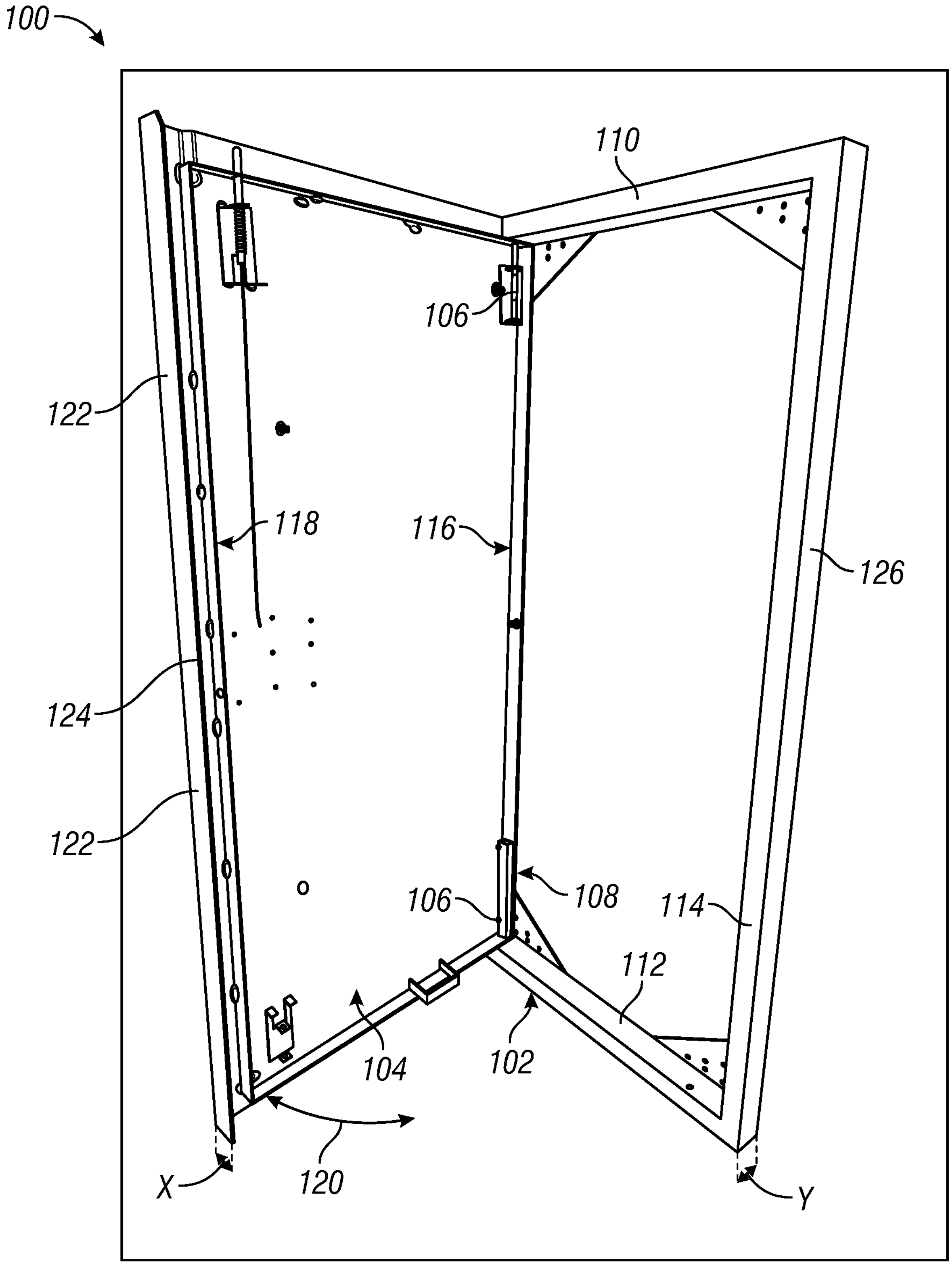
FIG. 4 is a perspective view of an assembly for securing a building opening with the door panel in an open position according to an embodiment of this disclosure.
Figure 5:
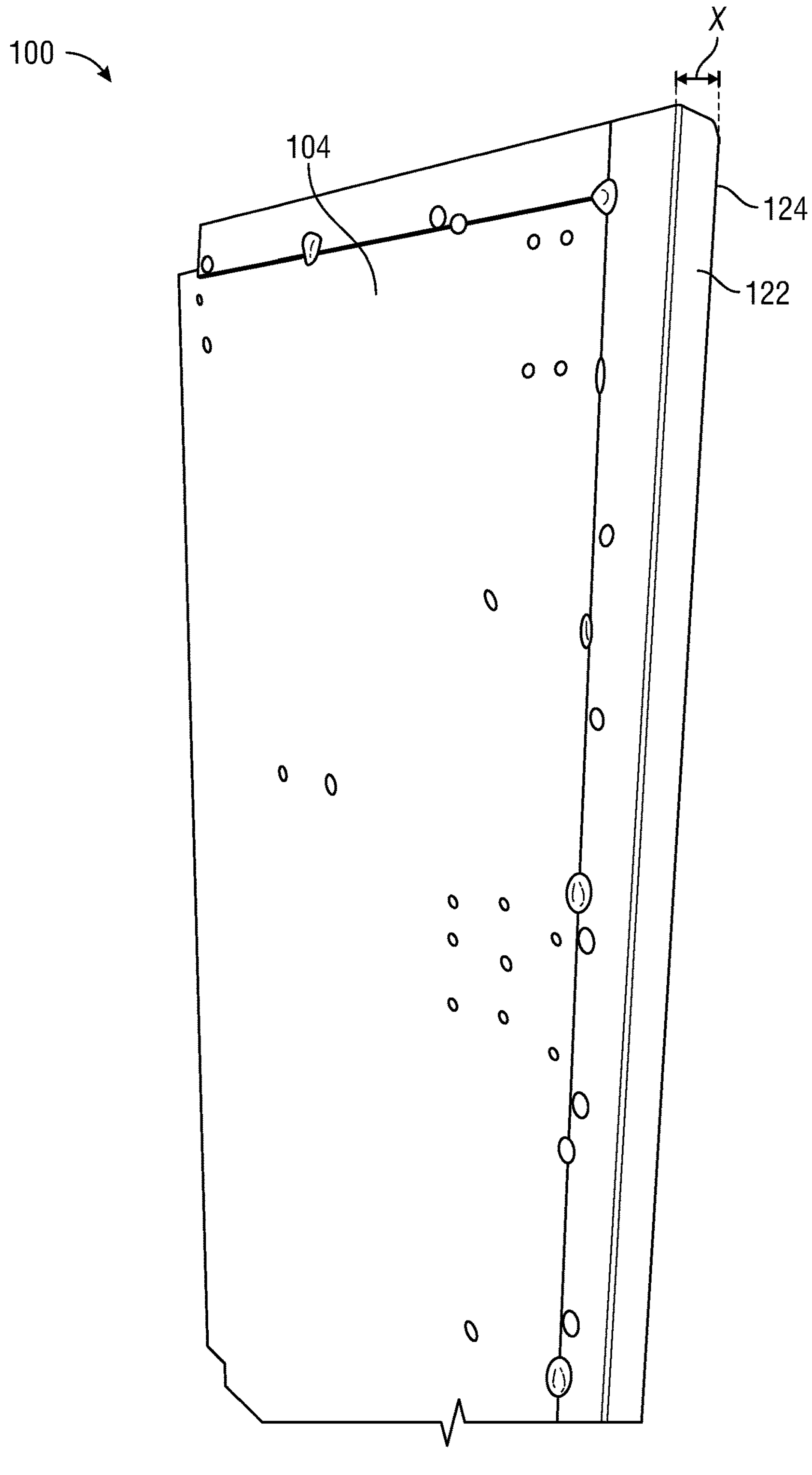
FIG. 5 is a perspective view of an assembly for securing a building opening with the door panel in a closed position according to an embodiment of this disclosure.

Referring now to FIG. 4, there is shown an assembly 100 for securing a door opening or other building opening according to an embodiment. In the example shown, the assembly 100 includes a frame assembly 102 that is pivotally connected to a door panel assembly 104 with one or more hinges 106. As shown, the frame assembly 102 includes a first leg 108, a second leg 110, a third leg 112, and a fourth leg 114. In some cases, the frame assembly 102 could be mounted to a structure with installation hardware, including but not limited to one or more installation bars or installation hooks or any other installation hardware. The door panel assembly 104 includes a proximal side 116 pivotally connected to the first leg 108 of the frame assembly 102 and a distal side 118 that pivots (along line 120) between a closed position (FIG. 2) adjacent the fourth leg 114 and away from the fourth leg 114 (FIG. 1).

In the embodiment shown, the distal side 118 of the door panel assembly 104 includes a door guard, which is embodied as a flange 122, to protect the distal side 118 of the door panel assembly 104 from being forcibly pried away from the frame assembly 102. As shown, the flange 122 extends substantially transversely from the distal side 118 of the door panel assembly 104 and terminates with a lip 124.

In some cases, the flange 122 is adjacent to an outside side 126 of the fourth leg 114 of the frame assembly 102 when the door panel 104 is in a closed position. Typically, in the closed position, the lip 124 will not be visible in front of the assembly 100 because the lip 124 will extend past a front side 128 of the fourth leg and be adjacent the outside side 126 of the fourth leg 114. In some embodiments, the flange 122 has a depth X corresponding with a depth Y of the frame assembly 102, which positions the lip 124 towards a rear portion of the fourth leg 114 hidden from view when the door panel assembly 104 is in the closed position.

Figure 6:
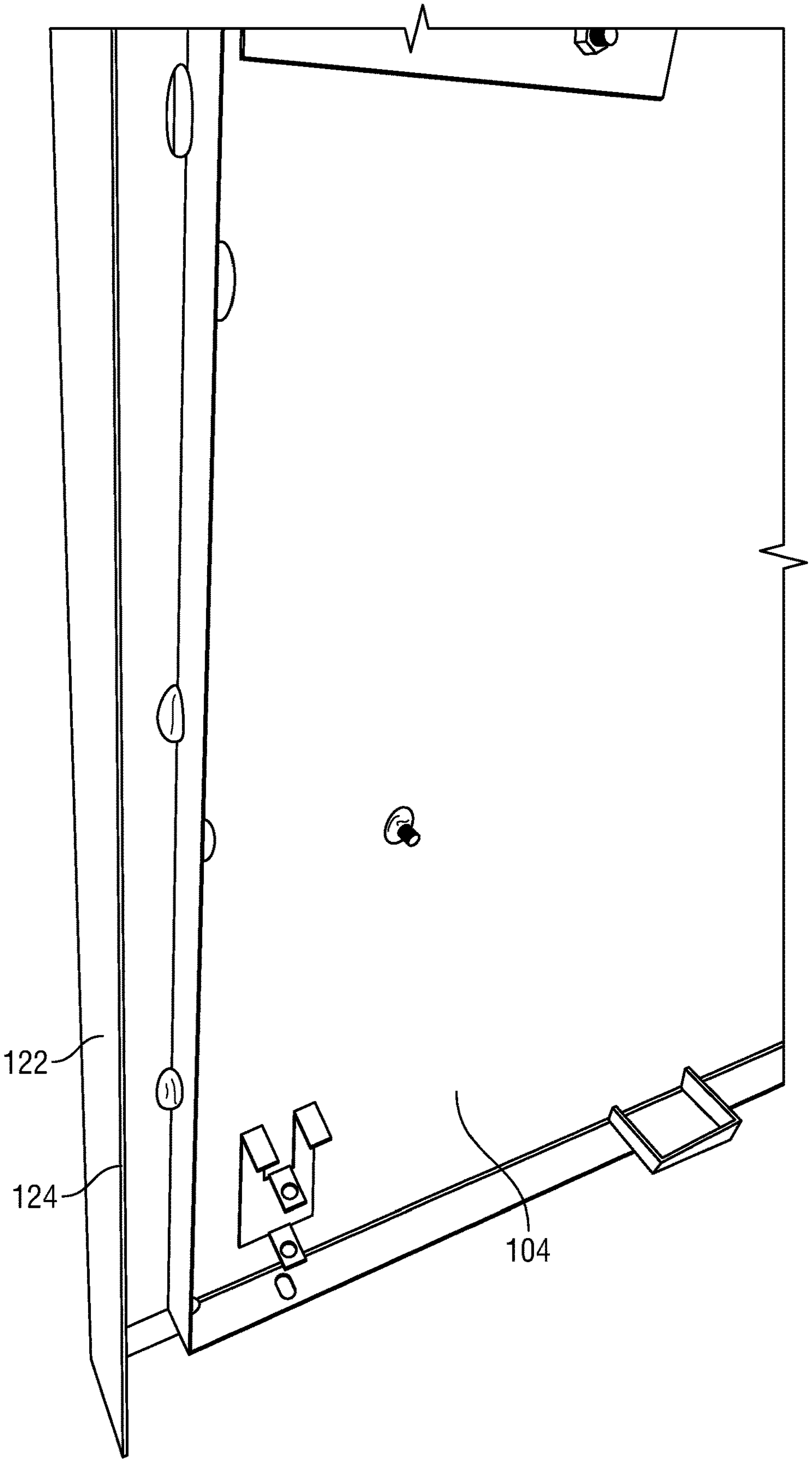
FIG. 6 is a detailed rear perspective view of a lower portion of the door panel showing a flange that protects against a forced attack according to an embodiment of this disclosure.
Figure 7:
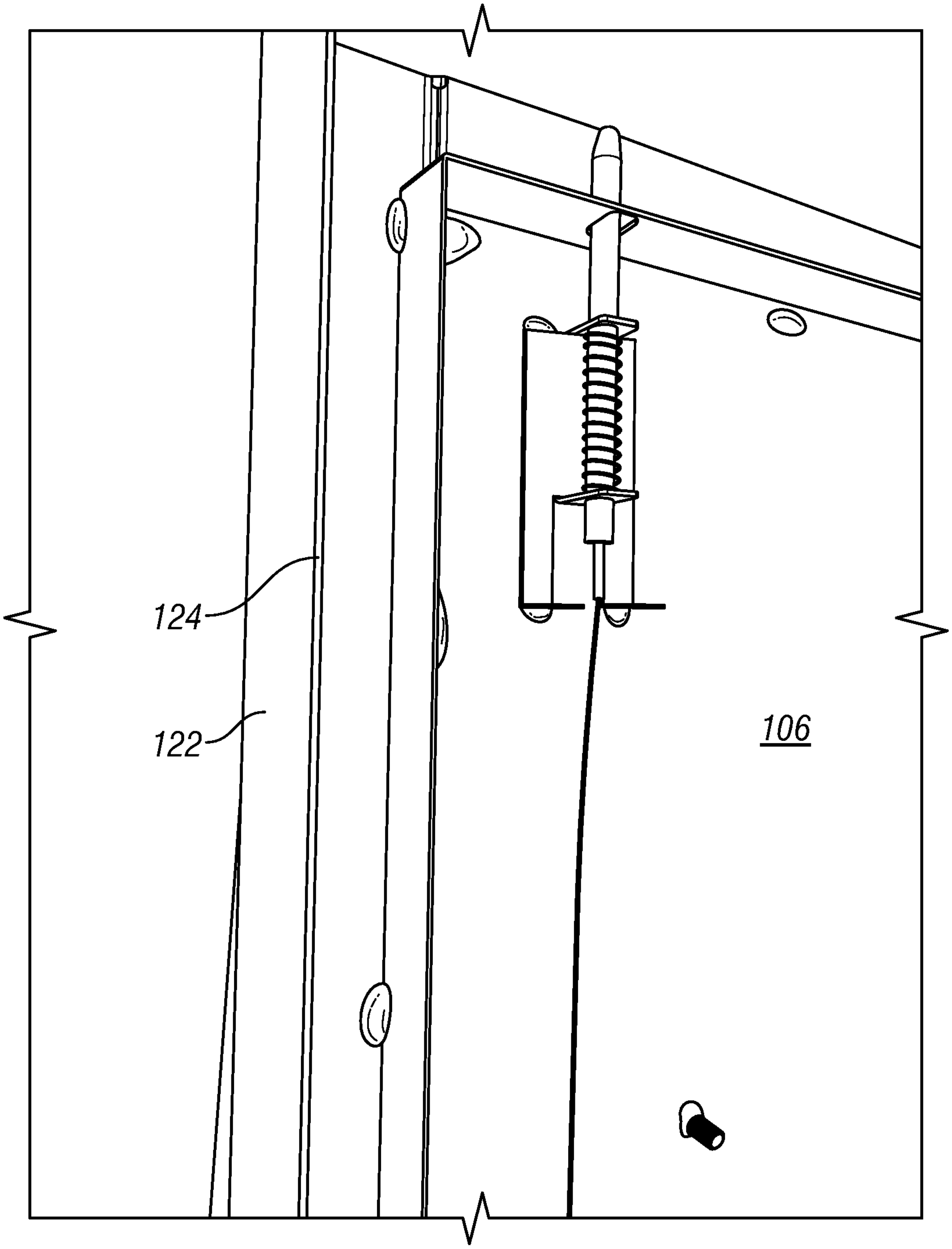
FIG. 7 is a detailed rear perspective view of an upper portion of the door panel showing a flange that protects against a forced attack according to an embodiment of this disclosure.

As seen in FIG. 4, a front face of the door panel assembly 104 defines a plane and the flange 122 defines a plane that is approximately perpendicular thereto. When the door panel assembly 104 is in the closed position, the flange is approximately coplanar with the outside edge 126 of the fourth leg. This positions the lip 124 spaced away from the plane defined by the front face of the door panel assembly 104 towards the rear of the assembly 100 out of view. FIGS. 6 and 7 illustrate detailed view of the flange 122 with the lip 124 on the upper and lower portions of the door panel assembly 104.

The inclusion of flange 122 provides benefits such as, for example, making it more difficult for an intruder to get a firm grip on the edge. In some cases, the flange 122 is formed from steel to add structural rigidity, thereby making the door panel more difficult to twist and damage in a forced entry attempt.

The invention claimed is:

1. An assembly for securely enclosing a door opening or window opening defined by a structure of a building comprising:

a frame sized to be disposed to substantially surround the opening and engage one side of the structure, the frame including a upper leg, a lower leg and a distal leg extending from the upper leg to the lower leg and interconnecting the upper and lower legs, each of the upper, lower and distal legs having a rectangular cross section;

a panel sized to substantially cover the opening, the panel having a substantially flat front face having a width and a substantially flat back face having a width, the panel being pivotally secured to the frame and pivotable between an open position and a closed position substantially covering the opening, the panel further including a top edge extending substantially the width of the front face and a bottom edge extending substantially the width of the front face;

installation hardware to secure the frame to the structure such that the frame and the panel are disposed substantially on one side of the structure and the frame engages the one side of the structure, and the installation hardware is disposed substantially on an other side of the structure and engages the other side of the structure;

locking means for selectively locking the panel to the frame in the closed position and unlocking the panel so that the panel can be pivoted to the open position when the installation hardware is secured to the frame;

wherein the panel includes a proximal side pivotally connected with the frame and a distal side movable between a position adjacent the frame when the panel is in the closed position and a position extending away from the frame when the panel is in the open position; and wherein the distal side of the panel includes an outer flange extending from a distal end of the distal side of the panel and having a length extending from the top edge of the panel to the bottom edge of the panel, one end of the outer flange terminating at the top edge of the panel and an other end of the outer flange terminating at the bottom edge of the panel, the outer flange and the distal side are rigid and immovably secured together and the outer flange extends directly from the distal end substantially perpendicular to the front face and is the only outer flange on the panel;

wherein the panel further includes an inner flange including a vertical portion spaced proximally from the outer flange extending parallel to the outer flange, the inner flange extending from the rear face of the panel perpendicular to the rear face, the vertical portion and outer flange defining a gap that extends along most of the length of the outer flange which receives the distal leg of the frame when the panel is in the closed position.

2. The assembly of claim 1, wherein the frame defines a frame plane and the outer flange defines a flange plane, and wherein the flange plane intersects the frame plane when the panel moves to the closed position.

3. The assembly of claim 2, wherein the panel defines a panel plane, and wherein the flange plane is substantially perpendicular to the panel plane.

4. The assembly of claim 1, wherein the flange terminates with a lip, and wherein the lip is substantially hidden from view when the panel is in the closed position.

5. The assembly of claim 1, wherein the distal leg has a front side, a rear side, an inside side and an outside side.

6. The assembly of claim 5, wherein the outer flange is adjacent to the outside side when the panel is in the closed position.

7. The assembly of claim 6, wherein the outer flange defines a flange plane and the outside side defines an outside plane, and wherein the flange plane and the outside plane are approximately parallel.

8. The assembly of claim 7, wherein the outer flange terminates with a lip, and wherein the lip is positioned between the front side and the rear side when the panel is in the closed position.

9. The assembly of claim 1, wherein the outer flange extends longitudinally substantially entirely between an upper portion and a lower portion of the panel.

10. The assembly of claim 1 wherein the inner flange includes an upper lateral portion extending perpendicular to the vertical portion in a distal direction, the upper lateral portion and the top edge of the panel defining a gap for receiving the upper leg of the frame when the panel is in the closed position.

11. The assembly of claim 1 wherein the inner flange includes a lower lateral portion extending perpendicular to the vertical portion in a distal direction, the lower lateral portion and the bottom edge of the panel defining a gap for receiving the lower leg of the frame when the panel is in the closed position.

* * * * *